United States Patent
Gnesin et al.

(12)

(10) Patent No.: US 6,589,898 B1
(45) Date of Patent: Jul. 8, 2003

(54) HIGH-TEMPERATURE STRENGTH AND HEAT-RESISTANT COMPOSITE MATERIAL "REFSIC"

(75) Inventors: Boris Abramovich Gnesin, Moscow (RU); Pavel Artemovich Gurzhiyants, Moskovskaya oblast (RU)

(73) Assignee: Institut Fiziki Tverdogo Tela Rossiiskoi Akademii, Chernogolovka (RU)

( * ) Notice: Subject to any disclaimer, the term of this patent is extended or adjusted under 35 U.S.C. 154(b) by 0 days.

(21) Appl. No.: 09/743,273

(22) PCT Filed: Jul. 5, 1999

(86) PCT No.: PCT/RU99/00221
§ 371 (c)(1),
(2), (4) Date: Jan. 8, 2001

(87) PCT Pub. No.: WO00/01637
PCT Pub. Date: Jan. 13, 2000

(30) Foreign Application Priority Data

Jul. 7, 1998 (RU) .......................................... 98114123

(51) Int. Cl.⁷ .......................... C04B 35/577; H05B 3/10
(52) U.S. Cl. ........................ 501/92; 501/96.3; 219/553
(58) Field of Search ................... 501/92, 96.3; 219/553

(56) References Cited

U.S. PATENT DOCUMENTS

| | | | |
|---|---|---|---|
| 4,970,179 A | | 11/1990 | Petrovic et al. |
| 5,439,855 A | * | 8/1995 | Rosenthal .................... 501/92 |
| 5,454,999 A | | 10/1995 | Jayashankar et al. ......... 501/92 |
| 5,640,666 A | * | 6/1997 | Jayashankar et al. ......... 501/92 |
| 5,965,051 A | * | 10/1999 | Hirayama et al. ........... 219/553 |
| 5,990,025 A | * | 11/1999 | Suyama et al. ............... 501/92 |

FOREIGN PATENT DOCUMENTS

| | | |
|---|---|---|
| RU | 1148129 | 3/1985 |
| RU | 1685752 | 10/1991 |
| RU | 1694552 | 11/1991 |
| WO | WO 95/31417 | 11/1995 |

OTHER PUBLICATIONS

Michael J. Maloney, et al., Materials Science and Engineering, vol. A155, pp. 19–31, "Developement of Continuous–Fiber–Reinforced MoSi₂–Base Composites", 1992.

R.M. Aikin, Jr., Materials Science and Engineering, vol. A155, pp. 121–133, Strengthening of Discontinuously Reiforced MoSi₂ Composites at High Temperatures, 1992.

R. Gibala, et al., Materials Science and Engineering, vol. A155, pp. 147–158, "Mechanical Behavior and Interface Design of MoSi₂–Based Alloys and Composites", 1992.

* cited by examiner

*Primary Examiner*—Karl Group
(74) *Attorney, Agent, or Firm*—Oblon, Spivak, McClelland, Maier & Neustadt, P.C.

(57) ABSTRACT

The invention relates to materials intended for use in an oxidative medium at high temperatures, including the manufacture of high-temperature electric heaters, parts, sensors and tools operating at temperatures of up to 1900° C. and higher. On the basis of tungsten and molybdenum suicides $MeSi_2$—$Me_5Si_3$ and silicon carbides materials are prepared, noted for a high level of temperature resistance, resistance to thermal shocks, refractoriness and wear resistance. Alloying with silicides of rhenium, tantalum, titanium, zirconium, niobium, and hafnium makes it possible to enhance the mechanical properties of materials. Materials with controllable porosity make it possible, compared with high-density materials, at a smaller density of the materials, to increase the resistivity and to reduce the thermal conductivity thereof.

9 Claims, No Drawings

HIGH-TEMPERATURE STRENGTH AND HEAT-RESISTANT COMPOSITE MATERIAL "REFSIC"

TECHNICAL FIELD

The invention relates to materials intended for use in an oxidative medium at high temperatures, including the manufacture of high-temperature electric heaters, parts, sensors and tools operating at temperatures of up to 1900° C. and higher.

BACKGROUND ART

Known in the art are refractory composite materials produced by powder metallurgy techniques, with a matrix from molybdenum disilicide ($MoSi_2$), reinforced with SiC fibers. The total silicon carbide concentration in this case does not exceed 40 vol. %. In order to preserve high properties of the silicon-carbide fiber, the temperature of the diffusion interaction between molybdenum disilicide and silicon carbide is limited to 1400° C.

A disadvantage of the resulting material is a high porosity and liability to crack formations especially after temperature cycling. Furthermore, it is necessary to use costly equipment for hot pressing at 1375° C. during 1 to 1.5 hours at a pressure of 28 to 240 MPa. High mechanical properties of the material are preserved only at temperatures not over 1400° C. (M. J. Maloney, R. J. Hecht, Development of continuous-fiber-reinforced $MoSi_2$-base composites, Materials Science and Engineering, v. A153, 1992, pp. 19–31).

The prior art most relevant to the proposed invention is the high-temperature composite material produced by powder metallurgy techniques and containing from 15 to 45 vol. % of silicon carbide in a molybdenum disilicide matrix. Such material has a low porosity. (R. M. Aikin, Jr., Strengthening of discontinuously reinforced $MoSi_2$ composites at high temperatures, Materials Science and Engineering, vol. A155, 1992, pp. 121–133).

The main disadvantages of the material are its insufficiently high stability in temperature cycling (repeated heating to working temperatures and cooling down after the operation), especially in the case of abrupt temperature changes (thermal shocks); and insufficiently high level of heat resistance. The labor inputs and expenses involved in making products of intricate configurations and large size increase, because the known materials containing molybdenum disilicide and silicon carbide are produced by powder metallurgy techniques which require preparing starting fine-grained powders and fibers, mixing thereof, as well as using expensive and technically complicated hot pressing at 1300–1800° C. for 1–10 hours in vacuum or in a protective atmosphere under a pressure of up to 310 MPa.

ESSENCE OF THE INVENTION

It is an object of the invention to provide materials with a high heat resistance, resistance to thermal shocks and thermostability, this being ensured by introducing silicides of different composition and in different amounts into the material, by obtaining a material with different ratios of the main phases (suicides of high-melting metals, silicon carbide and carbon) with different structure (mutual disposition of the phases, their size and form, crystallographic orientation, etc.) and, hence, with different combination of the indicated useful properties.

Said object is accomplished by a composite material comprising molybdenum disilicide and silicon carbide, and further comprising $W_5Si_3$ and $Mo_5Si_3$ and/or $(Mo, W)_5Si_3$ and/or $(Mo, W)_5Si_3C$, as well as $WSi_2$ and/or $(Mo, W)Si_2$ with the following ratio of the components (in vol. %):

| | |
|---|---|
| $W_5Si_3$ and $Mo_5Si_3$ and/or $(Mo, W)_5Si_3$ and/or $(Mo, W)_5Si_3C$ and/or $Mo_5Si_3C$ | 15–85% |
| silicon carbide | 2–85% |
| tungsten and/or molybdenum disilicides $WSi_2$ and $MoSi_2$ and/or $(Mo, W)Si_2$ | 0.8–55% | the ratio of molybdenum and tungsten in the total mass of the high-melting metals in the material ranging within (in wt. %):

| | |
|---|---|
| Mo | 7–80% |
| W | 20–93%. |

The composite material can also comprise rhenium in an amount of 0.5–20 atomic % of the total content of the molybdenum and tungsten substituted by it in the material.

Besides, the composite material can further comprise inclusions of graphite and/or carbon fibers which partially substitute silicon carbide, in an amount of 5–80 vol. % of the volume not occupied by the silicides of high-melting metals.

Furthermore, the composite material can be made multilayered, the inner layers thereof consisting of graphite and/or of layers of pyro-compacted carbon fabric or other dense carbon or silicon carbide material.

Moreover, the composite material can contain in the silicide phases at least one element of the group consisting of tantalum, niobium, titanium, zirconium, and hafnium, with the following ratio of these components with respect to the total mass of molybdenum and tungsten which they substitute, in wt. %: Ta, 0.1–18; Nb, 0.1–8; Ti, 0.05–10; Zr, 0.05–8; Hf, 0.1–16.

Furthermore, the composite material can contain pores occupying 15–78% of the volume of the material.

The composite material can also contain in its composition at least one of the elements which actively bind oxygen: boron, germanium, aluminum, magnesium, barium, strontium, calcium, sodium, potassium, yttrium, scandium, and rare-earth elements (lanthanoids) in an amount of 0.1–2 wt. %.

The essence of the invention is also in that an electric high-temperature heater is made from a composite material according to the invention, in which heater different sections can be made from different variants of the compositions or structures of the composite material; said electric high-temperature heater can be fully made from said material or with only the working portion of the electric heater or the most high-temperature part of the current leads being made from said material.

The essence of the invention is also in that that the structural part operating at a high temperature can be fully made from the composite material of the invention, different portions of said part being made from different variants of the compositions or structures thereof; said part can be fully made from said material or only the most high-temperature portion of said part can made from said material.

It is established experimentally, that relatively close values of the thermal expansion factors of the phases entering into the composition of the composite material, $(3–)\times 10^{-6}$/deg, throughout the temperature interval of their existence in the solid form, the appearance of noticeable plasticity in the silicide phases at temperatures above 1100° C., make it possible to obviate formation of cracks both when preparing the composite material and during temperature-cycling thereof, if said phases are used in the ratios indicated in the claims. All these phases are chemically compatible with each other at temperatures below 1850° C., mutual solubility variations with temperature for the main components are insignificant, and this also contributes to the heat resistance and stability of the materials of the present invention during temperature-cycling thereof.

The use of compositions $MeSi_2$—$Me_5Si_3$ of eutectic type at temperatures above 1900° C. makes it possible to treat a wide range of carbon and silicon carbide materials with silicide melts. These melts wet adequately both carbon and silicon carbide materials, penetrating under the effect of capillary forces into all voids therein: pores, cracks, hairseams, etc. As a result, the porosity of the obtained materials, as a rule, does not exceed 10 vol. %, usually being 3–5%.

If porosity is useful, for instance, from the standpoint of increasing the electrical resistance or reducing the thermal conductivity of the material, it can be specially provided within the controlled limits indicated in the claims.

When the proposed composite material is prepared from carbon-containing starting materials, displacement reactions are used (Me=Mo, W; $MeSi_2$=(Mo, W)$Si_2$; $Me_5Si_3$+(Mo, W)$_5Si_3$; $Me_5Si_3C$=(Mo, W)$_5Si_3C$):

$$5\ MeSi_2 + 7\ C \rightarrow Me_5Si_3 + 7\ SiC \quad (1)$$

$$5\ MeSi_2 + 8\ C \rightarrow Me_5Si_3C + 7\ SiC \quad (2)$$

Similarly, for a combination of the disilicide phases $WSi_2$, $MoSi_2$, (Mo, W)$Si_2$, the term "$MeSi_2$" may be used.

This makes it possible, owing to diffusion interaction of the melt of silicides with carbon materials, to increase the silicon carbide volume fraction in the resulting composite material, compared with the composition of the blank before its treatment with the melt, using for this purpose the carbon, molybdenum and tungsten disilicides contained in the blank. In such a case it is possible to provide a silicon carbide layer on the surface of carbon layers and to convert fully or partly carbon fibers into silicon carbide fibers, and carbon fabric layers into a skeleton from silicon carbide.

In case a silicon carbide blank is used, such a skeleton becomes modified after the interaction with silicide melts owing to partial recrystallization of silicon carbide.

The choice for solving a particular practical task of an optimal ratio between the main high-melting metals, molybdenum and tungsten, which enter into the composition and isomorphically substitute each other in the silicide phases $MeSi_2$ and $MeSi_5Si_3$, is connected with their different effect on the final properties of the obtained material. An increase of the concentration of molybdenum at the expense of tungsten allows the obtaining of a more light-weight material with a higher heat-resistance in the air of up to 1500° C. An increase of the relative content of tungsten at the expense of molybdenum increases the heat resistance, resistance to thermal shocks, and improves the compatibility of the silicide component of the material with its carbon and silicon carbide parts in temperature cycling in the case of refractory and temperature-resistant composite materials with carbon and silicon carbide components. A higher concentration of the silicide-alloying elements indicated in the claims also increases the strength of such materials and makes it possible to enhance the electric resistivity. Carbon filaments and carbon fabric layers, including silicon carbide material layers formed from carbon filaments and from carbon fabric layers, as well as graphite or carbon-carbon interlayers, make it possible to impart greater fracture toughness to the material, to reduce the density of the refractory and temperature-resistant material. Introducing $Me_5Si_3$ and/or $Me_5Si_3C$ phase and/or phases (where Me is W and/or Mo) along with $MeSi_2$ phases makes it possible to vary the electric resistivity of the electric heaters thus produced within a relatively wide range, to provide a high heat resistance and resistance to thermal shocks within a wide range of temperatures, up to 1900–2000° C.

The use of tungsten and/or rhenium for substituting molybdenum in the silicides $Me_5Si_3$ and $MeSi_2$ in the ranges indicated in the claims allows an essential increase in the heat resistance of the material compared with the use of molybdenum only. Molybdenum and/or rhenium in silicides make it possible to provide a high heat resistance in a wide range of temperatures. Tungsten and/or rhenium, when their content in suicides is increased at the expense of molybdenum, provide an increase in the resistance to thermal shocks. Alloying with rhenium in amounts close to the upper limit indicated in the claims may lead to the formation of a ReSi-based phase.

The main phase strengthening the composite material for operation at high temperatures is silicon carbide which was either present beforehand in the carbide or silicon carbide blank being treated with silicide melts or forms by reactions (1, 2) in the course of preparing refractory and temperature-resistant composite materials. As a result of treating with silicide melts, silicon carbide can recrystallize in the blanks in different modifications, including the cubic phase β-SiC. The obtaining of silicon carbide crystallites of 10–30 μm and less in cross-section is the most favorable for the mechanical properties of the composite material. High-strength carbon fibers preserved as a result of the interaction of suicides with the melt can also serve as a strengthening phase in the proposed composite materials.

The proposed composite materials can be used as a protective coating on different carbon or silicon carbide materials against oxidation at high temperatures.

Silicide phases with the conductivity of metallic type determine such properties of the composite material as heat resistance and electroconductivity. Silicon carbide is a typical semiconductor, its properties can tell strongly enough on the properties of resulting materials. Using different combinations of the phases constituting the material, their volume proportions and structures ("methods of packing" the phases in space), it is possible to obtain qualitatively differing types of the temperature dependence of the electric resistance of heaters made from the composite material according to the invention.

The presence of relatively wide concentration intervals of the existence of eutectic mixtures of phases $Me_5Si_3$—$MeSi_2$ makes it possible to use different compositions for treating with alloys with reactions (1, 2) taking place. Silicon which remains after the siliconization of carbonaceous materials also enters easily into silicide eutectic compositions, shifting the phase equilibrium after crystallization toward tungsten and molybdenum disilicides. Therefore siliconized carbon materials are one of the forms of blanks used for obtaining materials according to the invention.

The shape and size of the resulting articles depend on the shape and size of the blank from the composite material to be treated with alloys. Phases which are not melted by or only partially interact with silicide melt are dense graphites, carbon- and carbon composite materials, silicon carbide- and silicon carbide composite materials, carbon fibers, carbon fabrics or silicon carbide materials.

Dense carbon material can be coated with a protective layer based on the composite material of the invention, with an optional silicon carbide sublayer therebetween (having a thickness of up to 50 μm), formed directly on the surface of carbon material. Silicon carbide, including the case of its being present as a sublayer on carbon material, ensures heat resistance, whereas protection from high-temperature oxidation is provided by tungsten- and molybdenum-based silicides predominant in the external layers of such coating.

The composite material can be multilayer, comprising layers of graphite, which are light and stable to thermal shocks, or layers of other dense carbon material, each of these layers being protected against oxidation by external layers from the composite material with predominance of silicide phases and additionally reinforced from the surface by silicon carbide formed in accordance with displacement reactions. Thereby, in addition to an increase in the heat resistance and thermostability, there is provided a decrease in the density and an increase in the fracture toughness of the material owing to internal layers containing dense carbon material. The presence of internal layers of silicon carbide material, including those formed from the layers of carbon fabric as a result of the displacement reaction, allows an increase in the heat resistance of the composite material as a whole.

When dense carbon fibers, powdery blanks or powdery components of blanks containing dense coarse-grained graphite are used, some 5–80% of the carbon contained in the material may react not completely, yielding silicon carbide. The temperature resistance of the composite material and its stability to temperature cycling practically does not suffer. An increase in the concentration of free carbon above said limit leads to a decrease in the strength and temperature resistance.

It is possible to introduce into silicide phases tantalum, niobium, titanium, zirconium, hafnium in amounts indicated in the claims, as well as at least one of the below-listed elements: boron, germanium, aluminum, magnesium, barium, strontium, calcium, sodium, potassium, yttrium, scandium or rare-earth elements (lanthanoids), in a total amount of 0.1–2% by weight; thereby it is possible to improve such properties of the composite material as temperature resistance, creep resistance. All these materials, to one extent or another, are deoxidizers contributing to the removal of oxygen from the boundaries of silicon carbide and silicides,; they are also modifiers, under the action of which grain refining takes place in colonies of the $Me_5Si_3$—$MeSi_2$ eutectic. For erbium this phenomenon was pointed out by R. Gibala, A. K. Ghosh, D. C. Van Aken, et al. in "Mechanical behavior and interface design of $MoSi_2$-based alloys and composites", Materials Science and Engineering, v. A155, 1992, pp. 147–158) on the example of $Mo_5Si_3$—$MoSi_2$ eutectic. Due to their high liability to the chemical interaction with carbon, introducing tantalum, niobium, titanium, zirconium and hafnium into the material in the amounts indicated in the claims makes it possible to enhance the completeness of the reaction of carbon with silicide melts and may lead to the formation of carbides of these metals.

Introducing into silicide phases, besides molybdenum and tungsten, such metals as rhenium, titanium, zirconium, hafnium, tantalum and niobium makes it is possible to modify the physical and corrosion properties of silicide phases.

Using composite materials with pore volume fraction of 35–78%, it is possible to increase the electric resistance and to decrease the thermal conductivity of the proposed materials by 1.2–3 times. Materials with controllable porosity enable an essential decrease in the specific gravity of articles compared with high-density materials.

The use of the proposed composite materials in electric heaters or in parts operating at high temperatures, heterogeneous in different portions of the article, materials with different chemical, phase composition and structure in these portions, makes it possible to achieve different properties within these portions.

For instance, input leads can be made from graphite protected against oxidation with a coating described in the literature, based on silicon carbide and boron silicates, or with other known coating, and the working portion of the electric heater can be made from a porous or dense material "REFSIC" according to the invention, containing silicon carbide and tungsten silicides and molybdenum silicides.

If necessary, the high-temperature portion of the input leads or all the input leads can be fully made from this "REFSIC" material. The entire surface of the heater or of the part thereof manufactured from the material "REFSIC" of the invention or only a part of their surface, subjected to heating under service conditions to temperatures not exceeding 1300° C., can be provided with an additional known silicon carbide coating which promotes corrosion resistance in case of long-term heatings.

Melts based on suicides of high-melting metals, used for treating blanks can contain in their composition the alloying elements cited in the claims and carbon.

The described composite materials constitute a whole family with a very wide range of properties, which make it possible to select optimal composition and structure for a particular problem being solved.

EXEMPLARY EMBODIMENTS OF THE INVENTION

Example 1

Glued onto the entire surface of a part made from graphite, whose shape and size are close to those of an electric heater, are 2 layers of a pyro-compacted carbon fabric. These layers are covered with a melt which contains molybdenum and tungsten (in the weight ratio for high-melting metals (Me) in the material 80 and 20%, respectively) and silicon in amounts ensuring, with allowance for the predominant ablation of high-melting metals, the following ratio of volume fractions of the phases in the refractory and temperature-resistant material which makes up a protective coating on graphite: silicon carbide, 2%; pyro-compacted fiber filaments, 8%; $Me_5Si_3$ and/or $Me_5Si_3C$ phases, 35%; and $MeSi_2$ phase, 55%. The thickness of the protective coating formed on graphite is about 1.5 mm. Here, as well as in the subsequent Examples, the volume fractions of phases are indicated without taking into account the volume occupied by pores (about 5%). Working temperatures of the heater for long-term operation in air are up to 1650° C. The heater withstands abruptly alternating heating and cooling cycles.

Example 2

A tube made from self-bonded silicon carbide with an outer diameter of 14 mm and an inner diameter of 7 mm is impregnated with a melt containing high-melting metals (Me, of which 7% by weight is Mo and 93% by weight is W), silicon and carbon. After crystallization, the volume fraction of silicon carbide is 75%; of $Me_5Si_3$, 15%; and of $MeSi_2$, 10%. A tubular heater of such type can operate for a short period of time in air and in a hydrocarbon medium at a temperature of up to 1850° C., withstanding abrupt temperature cyclings.

Example 3

A part manufactured from pressed thermally split graphite in the form of a screen with a density close to 0.6 g/cm³ is treated with a melt of $Me_5Si_3+MeSi_2$, whose composition is close to eutectic, containing 69% by weight of molybdenum, 20% by weight of tungsten and 11% by weight of rhenium (this amounting to 12.3% of the total weight of molybdenum and tungsten) as the high-melting metal (Me) After cooling down to room temperature, small distortions of the part form took place, the part tolerates abruptly alternating heating and cooling cycles, its compression strength is over 14 kg/mm² to a temperature about 1900° C., the volume fractions of the phases being as follows: SiC, 14.2%; $Me_5Si_3$, 85; $MeSi_2$, 0.8%.

Example 4

Carbon-carbon composite material is tightly cemented over with one layer of partially pyro-compacted carbon fabric, treated with a melt of suicides of eutectic type $Me_5Si_3+MeSi_2$, containing silicon and high-melting metals. As a mixture of high-melting metals, use is made of 81% by weight of tungsten, 7% by weight of molybdenum and 12% by weight of tantalum. After the impregnation of the fabric with the melt and crystallization, a coating is formed on the surface of the composite material, which protects it from oxidation at temperatures of up to 1900° C. The part can be used as a support for samples in an induction furnace operating in air.

Example 5

A strip electric heater is produced by impregnating four layers of carbon fabric, tightly cemented together, with a melt $Me_5Si_3+MeSi_2$ (as the high-melting metal Me use being made of a mixture of 65% by weight of tungsten, 35% by weight of molybdenum) whose composition is close to eutectic, the degree of pyro-compaction of two internal layers of the blank being higher than that of its two external layers. The ratio of the phases in the sample after the impregnation (in volume %): silicon carbide, 12%; $Me_5Si_3$, 54%; $MeSi_2$, 28%; carbon fibers, 6%. The heater tolerates slight elastic bending and withstands short-time heatings with a temperature above 1900° C. on the surface.

Example 6

An electric heater with graphite-based input leads and the working portion from a porous material is manufactured by impregnating a blank having the required shape with a $Me_5SI_3+MeSi_2$ melt (a mixture containing 20% by volume of tungsten and 80% by volume of molybdenum is used as the high-melting metal). The blank to be impregnated is prepared by joined compacting on an organic binder based on polyvinyl alcohol a porous (65% by volume) powdery silicon carbide blank (with the mean grain size of 50–60 μm) and graphite input leads preliminarily tightly glued with one layer of carbon fabric all over the surface thereof. The ratio of phases in the working portion of the sample after the impregnation is: the volume fraction of pores, 48% by volume. In the remaining 52% of the volume the relative volume concentration of phases is as follows: silicon carbide, 85%; $Me_5Si_3+MeSi_2$, 15%. All the grains of silicon carbide are coated with a protective layer of silicide phases. The heater is noted for small weight, high mechanical strength and relatively high resistivity, and it can operate steadily to the temperature of 1700° C.

Industrial Applicability

The proposed composite material and articles produced therefrom can be produced on industrial high-temperature apparatus, for instance, on apparatus for oriented crystallization of high-melting oxides or intermetallides, with the proviso that available temperatures in the process exceed 2000° C. The material to be melted and the blank to be impregnated with the melt are prepared by conventional powder metallurgy techniques. Using methods described in the literature, it is possible to prepare technological precursors (blanks) in the form of carbon and silicon carbide materials, including those with heterogeneous structure and composition.

What is claimed is:

1. A composite material comprising silicon carbide, molybdenum and tungsten silicides $(Mo, W)_5Si_3$ and/or $(Mo, W)_5Si_3C$, and molybdenum and tungsten disilicides $((Mo, W)Si_2$, wherein the composite material has the following ratio of components (vol. %):

| | |
|---|---|
| $(Mo, W)_5Si_3$ and/or $(Mo, W)_5Si_3C$ | 15–85% |
| silicon carbide | 2–85% |
| $(Mo, W)Si_2$ | 0.8–55%, and | the amount of molybdenum and tungsten in the composite material is (wt. % based on the total weight of the metal elements):

| | |
|---|---|
| Mo | 7–80% |
| W | 20–93%. |

2. A composite material according to claim 1, further comprising rhenium in an amount of 0.5–20 at. % with respect to the total amount of molybdenum and tungsten in the composite material.

3. A composite material according to claim 1 further comprising graphite inclusions and/or carbon fibers, wherein the graphite inclusions and/or carbon fibers are present in an amount of 5–80% of the volume not occupied by the molybdenum and tungsten suicides.

4. A multilayered composite material, comprising:
   at least one internal layer comprising a material selected from the group consisting of graphite, pyro-compacted carbon fabric, dense carbon, silicon carbide, and the composite material of claim 1; and
   said at least one internal layer is disposed between external layers comprising the composite material of claim 1.

5. A composite material according to claim 1, wherein the tungsten and molybdenum silicides further comprise at least one element selected from the group consisting of tantalum, niobium, titanium, zirconium, and hafnium, and having the following amount of these elements with respect to the total amount of molybdenum and tungsten (in wt. %): Ta, 0.1–18; Nb, 0.1–8; Ti, 0.05–10; Zr, 0.05–8; Hf, 0.1–16.

6. A composite material according to claim 1, further comprising pores occupying 15–78% of the volume of the composite material.

7. A composite material according to claim 1, further comprising 0.1–2 wt. % of at least one element which actively binds oxygen selected from the group consisting of boron, germanium, aluminum, magnesium, barium, strontium, calcium, sodium, potassium, yttrium, scandium and rare-earth elements.

8. A heater, comprising a composite material according to claim 1.

9. A structural part comprising the composite material according to claim 1.

* * * * *